Sept. 13, 1955 L. L. CHRISTY 2,717,778
CONTROL MEMBER FOR HOUSE TRAILER WINDOWS
Filed Oct. 6, 1953 3 Sheets-Sheet 1
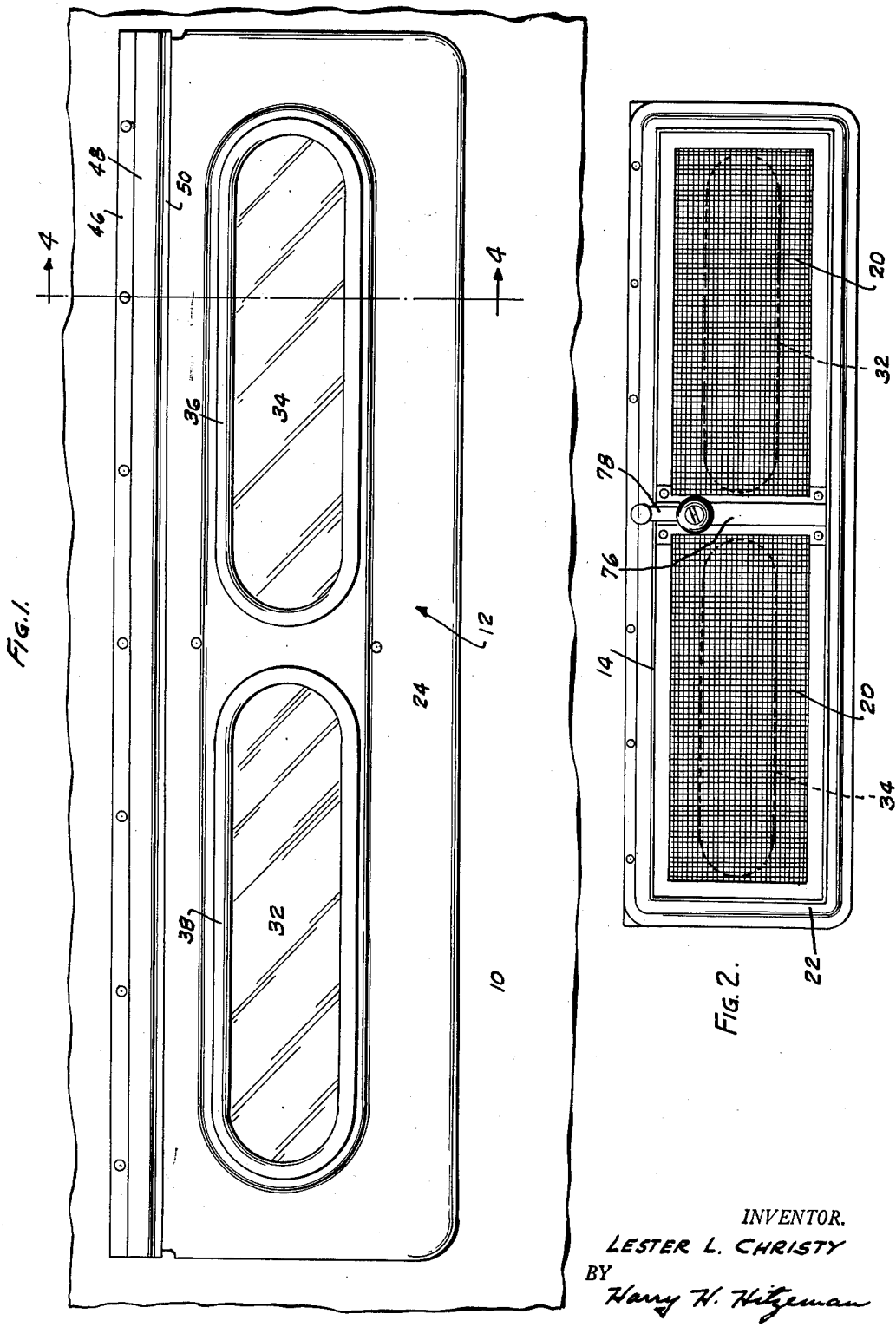
INVENTOR.
LESTER L. CHRISTY
BY
Harry H. Hitzeman
ATTORNEY.

Sept. 13, 1955 L. L. CHRISTY 2,717,778
CONTROL MEMBER FOR HOUSE TRAILER WINDOWS
Filed Oct. 6, 1953 3 Sheets-Sheet 2

INVENTOR.
LESTER L. CHRISTY
BY
Harry N. Hitzeman
ATTORNEY.

Sept. 13, 1955  L. L. CHRISTY  2,717,778
CONTROL MEMBER FOR HOUSE TRAILER WINDOWS
Filed Oct. 6, 1953  3 Sheets-Sheet 3
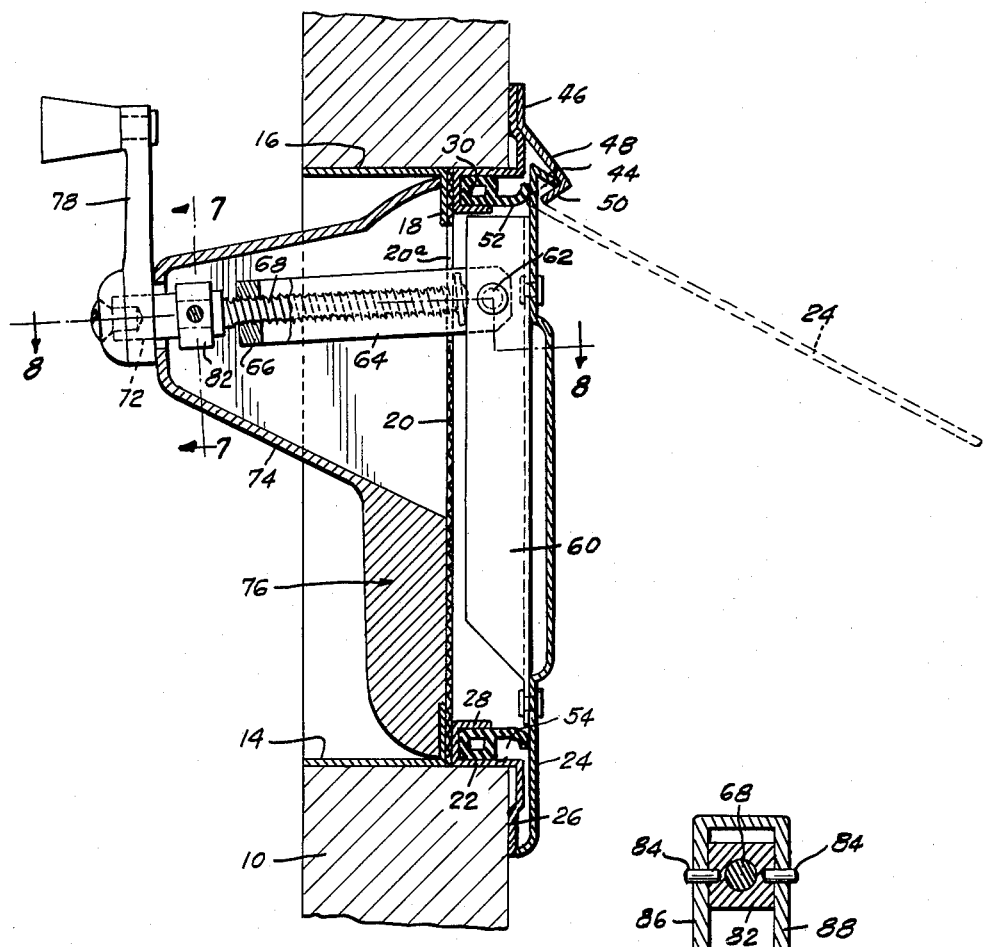
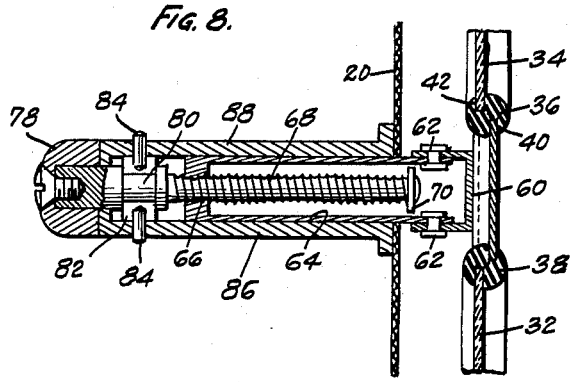
INVENTOR.
LESTER L. CHRISTY
BY
Harry N. Hitzeman
ATTORNEY.

United States Patent Office 2,717,778
Patented Sept. 13, 1955

2,717,778

CONTROL MEMBER FOR HOUSE TRAILER WINDOWS

Lester L. Christy, Syracuse, Ind.

Application October 6, 1953, Serial No. 384,387

3 Claims. (Cl. 268—108)

My invention relates to improvements in house trailer windows.

My invention relates more particularly to an improved window frame, window and screen assembly capable of easy and quick installation as a unit on house trailers or mobile homes.

In house trailers or mobile homes it is usually desirable to have comparatively large windows for light and observation, and several smaller windows capable of easy opening and closing from the inside of the unit for ventilation. These smaller windows are usually provided with screens to exclude insects, the screens usually being permanently installed upon the outside of the movable window.

My invention relates to improvements in the construction of adjustably hinged windows capable of operation from the inside of a house trailer or other enclosure.

My invention further relates to an improved construction of the same wherein a screen member is permanently fastened in the window assembly back of the pivotally mounted window sash.

Other features of the invention include the construction and operation of the window sash control, the weatherproof seal which results when the window sash is completely closed, the novel assembly arrangement of the parts, and other advantages which will be more apparent from the following description wherein reference is had to the accompanying drawings, upon which:

Fig. 1 is a fragmentary front elevational view of a house trailer wall showing the window in position therein;

Fig. 2 is a back view of the window unit showing the screen that is built into the unit behind the movable window;

Fig. 6 is a cross-sectional view thereof taken generally on the line 6—6 of Fig. 3 with parts broken into section to more clearly show other parts;

Fig. 7 is a cross-sectional view through the control housing and associated parts; and Fig. 8 is a plan sectional view thereof taken on the line 8—8 of Fig. 6.

Figure 3:
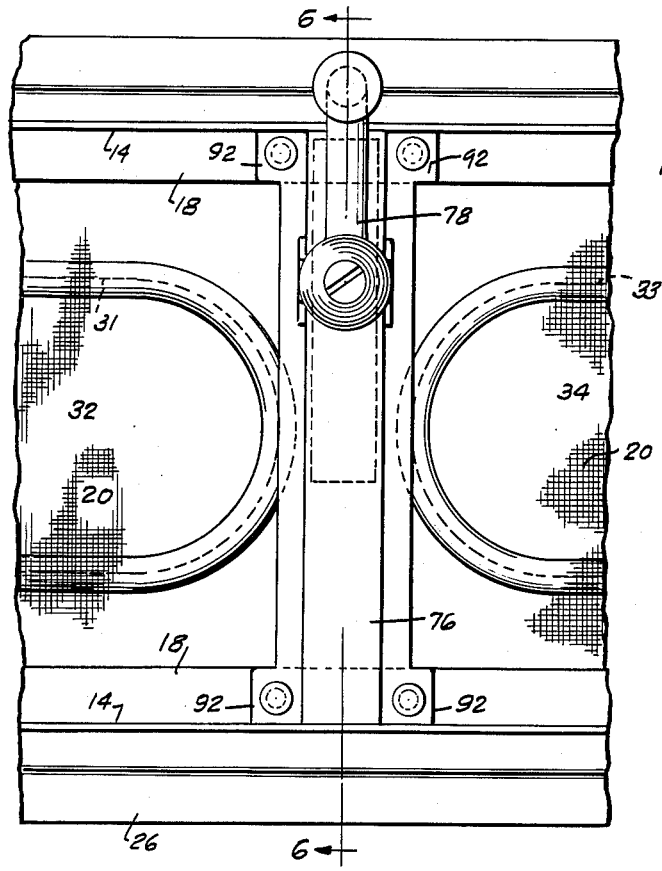
Fig. 3 is an enlarged fragmentary view of the window frame control bracket showing the manner in which it is mounted in the back of the apron or trim of the window.
Figure 4:
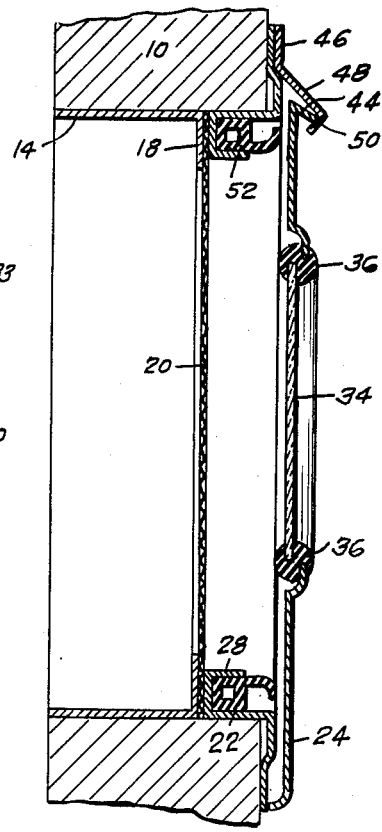
Fig. 4 is a cross-sectional view through the complete unit taken generally on the line 4—4 of Fig. 1.

In the embodiment of the invention which I have chosen to illustrate and describe the same, Fig. 1 illustrates a typical installation of one of my improved windows in the side wall 10 of a house trailer or mobile home. The unit 12 may be mounted in the wall 10 about its apron or trim 14 which may be fastened in any suitable manner in the opening 16 in the wall 10.

The window unit may comprise generally four parts, the hexagonally shaped trim or apron 14 which is made of sheet metal, preferably aluminum, and provided with a screen retaining ledge 18, a screen 20, a window frame 22, and a window sash 24. The frame 22 may have a front, transversely directed peripheral panel 26 which provides a trim about the opening 16 of the trailer wall and a U-shaped gasket retaining trough 28 fastened therein adjacent the front opening of the same, the trough 28 having a transverse ledge 30 which is placed against one side of the screen 20, and the screen is fastened between this wall and the ledge 18 of the apron or trim 14, in a manner which will be hereinafter described.

The window sash 24 may be generally rectangularly in shape and has a pair of elongated openings 31 and 33 therein in which a pair of elongated windows 32 and 34 are mounted in suitable rubber retaining rings 36 and 38. These rings may be of the usual type that have a pair of slots 40 and 42, one to fasten the ring in the opening in the window frame, and the other to receive the window pane.

Figure 5:
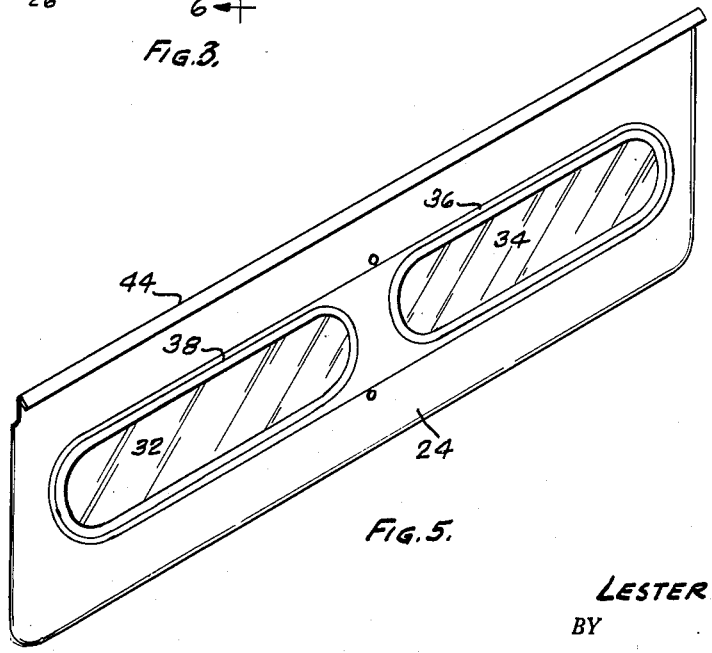
Fig. 5 is a front perspective view of the novel window frame and window unit which I employ.

As is best shown in Fig. 5, the window sash 24 is provided with a downwardly turned upper ledge 44 which in cooperation with the hinge plate 46 that is mounted upon the window frame 22 provides an effective hinge action, as will be hereinafter pointed out. The hinge plate 46 has a slanting front ledge 48 which may also act as an awning over the window, and an inwardly turned ledge portion 50.

The ledge 44 of the window frame is adapted to be inserted from one end and slid behind the ledge 50 so that when in position the window frame is supported by the ledge 44 upon the ledge 50. A weather-proofing gasket member 52, rectangular in periphery, is mounted in the trough 28, with an outwardly projecting lip portion 54 that is pressed to the position shown in Fig. 6, when the window is closed.

For swinging the window sash 24 about its pivot between its ledge 44 and the ledge 50 of the hinge plate 45, I provide a control unit operable from the inside of the house trailer. This control member may include a U-shaped bracket 60 fastened medially of the window frame and connected by pivot pins 62 to a U-shaped control bracket 64. The bracket 64 has a screw-threaded bore 66 through the base of the same to receive a double lead screw 68 that has a stop washer 70 at its end. The screw 68 is connected to the end of a shank 72 which passes through an opening in the control housing 76 and is fastened at its end to an operating crank 78. The shank 72 has a reduced portion 80 to receive and hold against movement a pivot bracket 82 that is mounted for slight angular turning movement upon a pair of pin members 84 positioned in the side walls 86 and 88 of the control housing 76.

With this construction, when it is desired to open a window to permit ventilation, the crank may be operated and by means of the double lead screw 66, the control bracket 64 may be moved outwardly or inwardly, moving the window sash 24 about its hinge area from the dotted line position shown in Fig. 6 to a full complete closure shown in full lines in Fig. 6.

The control housing 76, which is preferably a hollow die casting as shown, may be formed with ears 92 by which the same may be fastened with suitable rivets or screws through the flanges 18 of the apron or trim 14 and the adjoining wall of the trough 28, the fastening members also passing through the screen 20 and serving to hold the same in position. The screen 20, as best seen in Fig. 6, has a rectangularly shaped opening 20a through which the control bracket 64 passes.

From the above and foregoing description it can be seen that I have provided a construction wherein there is combined in a unitary assembly a window and a screen combined together with the apron or trim which fits in the window opening of the wall of the trailer. The screen being fastened between the apron and the window support frame, permits ready opening or closing of the window, and the control mechanism which I have provided permits the opening or closing to any desired degree. Further, due to the weatherproofing gasket or seal which extends about the periphery of the window frame, whenever the window is closed a completely sealed and insulated condition prevails.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. A control member for a hinged window which includes a hollow bracket having a chamber therein with one open end, said bracket adapted to be rigidly fastened adjacent one side of said window, a pivot bracket mounted in the chamber of said hollow bracket, a screw rotatably mounted in said pivot bracket, one end of said screw extending through an opening in the wall of said hollow bracket, a crank handle attached to this end of said screw and a bracket screw-threadedly mounted on the other end of said screw, said bracket having a tapped hole in which said screw rotates to move said bracket back and forth on said screw, one end of said bracket being pivotally connected to said window.

2. A control member for a hinged window which includes a hollow bracket having a chamber therein with one open end, said bracket rigidly fastened on one side of said window, a pivot bracket mounted in the chamber of said hollow bracket, a screw having a shank extension rotatably mounted in said pivot bracket, said screw having an enlarged shoulder engaging one side of said pivot bracket, said housing enclosing said screw on three sides thereof, the shank end of said screw extending through an opening in one wall of said housing, a crank attached to this end of said screw and a bracket screw-threadedly mounted on the other end of said screw, said bracket being U-shaped and having a tapped hole through its base in which said screw rotates, the legs of said bracket extending from the open end of said housing and being pivotally attached to said hinged window, said legs being parallel and being guided against two sides of said housing during their movement.

3. A control member for a hinged window which includes a stationary bracket fastened adjacent one side of said window, a screw pivot mounted in said bracket, a screw rotatably mounted in said pivot, one end of said screw extending from said bracket, a crank handle attached to this end of said screw and a member screw-threadedly mounted on the other end of said screw, said member having a tapped hole in which said screw rotates to move said member back and forth on said screw, one end of said member being connected to said window to move the same about its hinges.

References Cited in the file of this patent

UNITED STATES PATENTS

| | | |
|---|---|---|
| 1,640,483 | Cummings | Aug. 30, 1927 |
| 1,739,726 | Marshall et al. | Dec. 17, 1929 |
| 1,851,810 | Cone | Mar. 29, 1932 |
| 1,902,266 | Ripp | Mar. 21, 1933 |
| 2,166,710 | Axe | July 18, 1939 |
| 2,494,844 | Tondora | Jan. 17, 1950 |
| 2,549,110 | Michael | Apr. 17, 1951 |
| 2,570,992 | Thomas | Oct. 9, 1951 |
| 2,622,672 | Thomas | Dec. 23, 1952 |

FOREIGN PATENTS

| | | |
|---|---|---|
| 204,890 | Great Britain | Oct. 11, 1923 |
| 838,353 | France | Dec. 7, 1938 |